US011951853B2

(12) United States Patent
Montague

(10) Patent No.: US 11,951,853 B2
(45) Date of Patent: Apr. 9, 2024

(54) ELECTRIC VEHICLE FASTENING AND CHARGING SYSTEM WITH WIRELESS CONTROL

(71) Applicant: Metro Mobility, LLC, Cambridge, MA (US)

(72) Inventor: David Montague, Cambridge, MA (US)

(73) Assignee: Metro Mobility, LLC, Cambridge, MA (US)

( * ) Notice: Subject to any disclaimer, the term of this patent is extended or adjusted under 35 U.S.C. 154(b) by 363 days.

(21) Appl. No.: 17/285,372

(22) PCT Filed: Dec. 9, 2019

(86) PCT No.: PCT/US2019/065145
§ 371 (c)(1),
(2) Date: Apr. 14, 2021

(87) PCT Pub. No.: WO2020/123337
PCT Pub. Date: Jun. 18, 2020

(65) Prior Publication Data
US 2021/0323424 A1 Oct. 21, 2021

Related U.S. Application Data

(60) Provisional application No. 62/777,877, filed on Dec. 11, 2018.

(51) Int. Cl.
*B60L 53/18* (2019.01)
*B60L 53/30* (2019.01)
(Continued)

(52) U.S. Cl.
CPC ............... *B60L 53/18* (2019.02); *B60L 53/30* (2019.02); *B60L 53/60* (2019.02); *B62H 3/00* (2013.01);
(Continued)

(58) Field of Classification Search
None
See application file for complete search history.

(56) References Cited

U.S. PATENT DOCUMENTS 5,627,448 A * 5/1997 Okada .................... B60L 53/65
439/304
8,753,136 B2 6/2014 Hirashita et al.
(Continued)

FOREIGN PATENT DOCUMENTS

CN 106761047 A * 5/2017
CN 107804416 A 3/2018
(Continued)

OTHER PUBLICATIONS

International Search Report of PCT/US19/65145 dated Feb. 25, 2020 [PCT/ISA/210].
(Continued)

*Primary Examiner* — Fekadeselassie Girma
(74) *Attorney, Agent, or Firm* — Sughrue Mion, PLLC

(57) ABSTRACT

An electric vehicle fastening and charging combined system for a charging and storage station, such as those used for bicycle or scooter sharing programs, where a multi-purpose cable extends between the charging and storage station and the electric vehicle, and serves to fasten the electric vehicle to the charging and storage station to prevent removal or theft of the electric vehicle, and to conduct electricity to charge the electric vehicle, and wherein the fastening and/or detaching of the cable is controlled by a wireless signal.

19 Claims, 11 Drawing Sheets

(51) Int. Cl.
  B60L 53/60 (2019.01)
  B62H 3/00 (2006.01)
  B62H 5/00 (2006.01)
  B62J 43/13 (2020.01)
  G08C 17/02 (2006.01)
  H01R 13/627 (2006.01)
  H02J 7/00 (2006.01)

(52) U.S. Cl.
  CPC ............. *B62H 5/003* (2013.01); *B62J 43/13* (2020.02); *G08C 17/02* (2013.01); *H01R 13/6276* (2013.01); *H02J 7/0045* (2013.01); *H01R 2201/26* (2013.01)

(56) References Cited

U.S. PATENT DOCUMENTS

| | | | |
|---|---|---|---|
| 8,823,486 B2 | 9/2014 | Jung et al. | |
| 10,707,623 B2* | 7/2020 | Ando | H01R 13/64 |
| 2009/0082916 A1 | 3/2009 | Tanaka | |
| 2010/0228405 A1 | 9/2010 | Morgal et al. | |
| 2011/0201223 A1* | 8/2011 | Kurumizawa | B60L 50/61 439/345 |
| 2011/0281452 A1* | 11/2011 | Kurumizawa | B60L 50/16 439/304 |
| 2011/0294328 A1* | 12/2011 | Katagiri | B60L 53/16 439/304 |
| 2012/0011902 A1 | 1/2012 | Meekma | |
| 2012/0047971 A1* | 3/2012 | Katagiri | B60L 50/16 70/58 |
| 2012/0083148 A1* | 4/2012 | Hirashita | H01R 13/639 439/304 |
| 2012/0135634 A1 | 5/2012 | Gaul et al. | |
| 2012/0186309 A1* | 7/2012 | Ishida | B60L 50/16 70/57 |
| 2012/0238122 A1* | 9/2012 | Hirashita | B60L 53/16 439/304 |
| 2013/0102163 A1* | 4/2013 | Basavarajappa | B60L 53/68 310/67 R |
| 2014/0170879 A1 | 6/2014 | Kahara et al. | |
| 2017/0297443 A1* | 10/2017 | You | H01R 13/6395 |
| 2018/0297481 A1* | 10/2018 | Augst | B60L 53/18 |
| 2018/0316136 A1* | 11/2018 | Cho | B60L 53/16 |
| 2018/0370378 A1* | 12/2018 | Konishi | H02J 7/0042 |

FOREIGN PATENT DOCUMENTS

| | | | |
|---|---|---|---|
| DE | 19642687 A1 * | 4/1998 | .............. B60L 53/11 |
| DE | 102017200596 A1 * | 7/2018 | |
| EP | 2 915 732 A1 | 9/2015 | |
| EP | 2871723 B1 * | 4/2018 | .............. B60K 1/04 |
| KR | 10-1612286 B1 | 4/2016 | |
| WO | 2012/107448 A1 | 8/2012 | |
| WO | WO-2018039691 A1 * | 3/2018 | .............. B60L 53/16 |

OTHER PUBLICATIONS

Written Opinion of PCT/US19/65145 dated Feb. 25, 2020 [PCT/ISA/237].
Extended European Search Report dated Aug. 12, 2022 from the European Patent Office in EP Application No. 19895494.3.

* cited by examiner

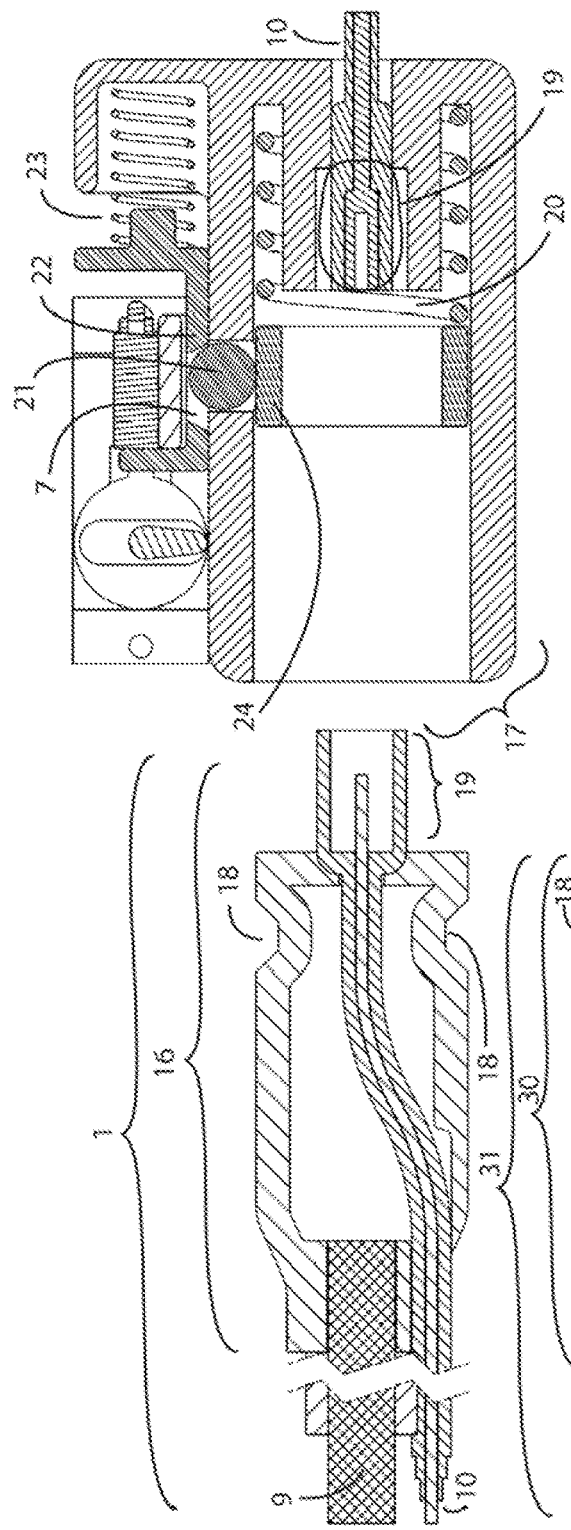
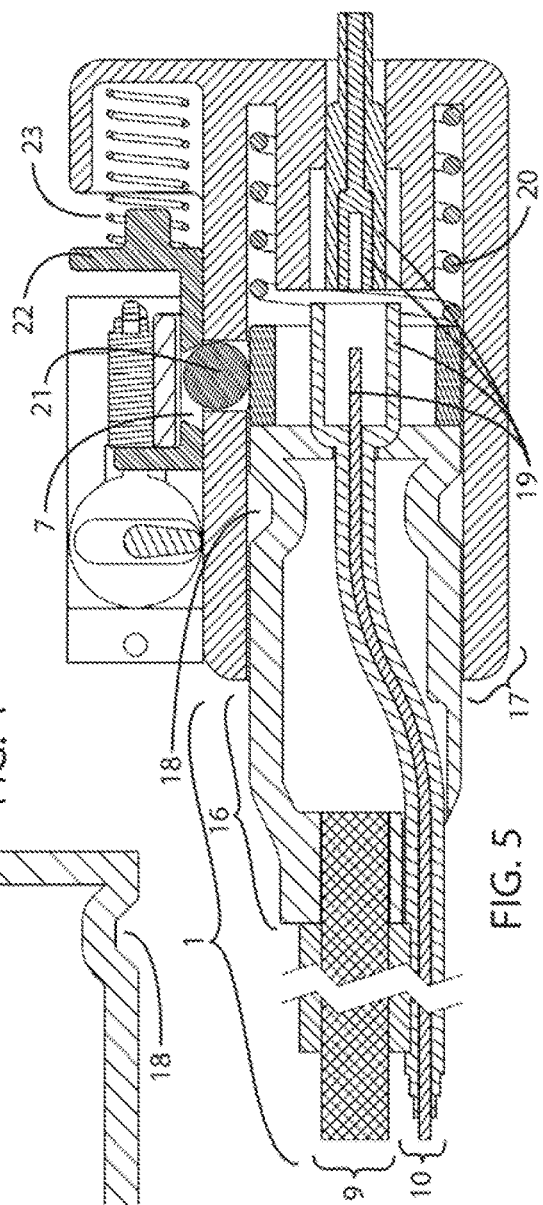
FIG. 4
FIG. 5

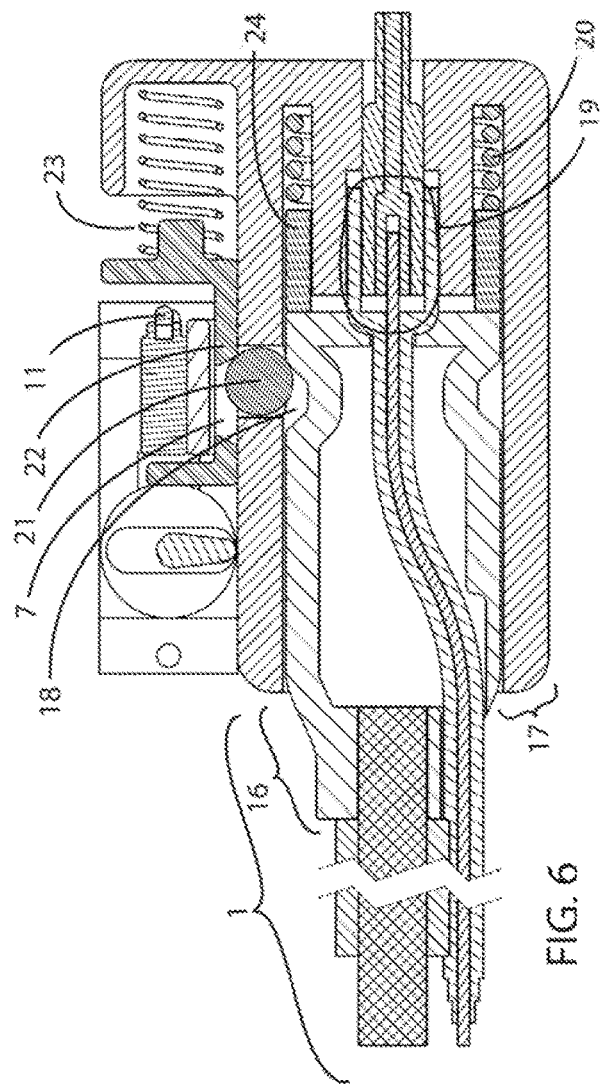
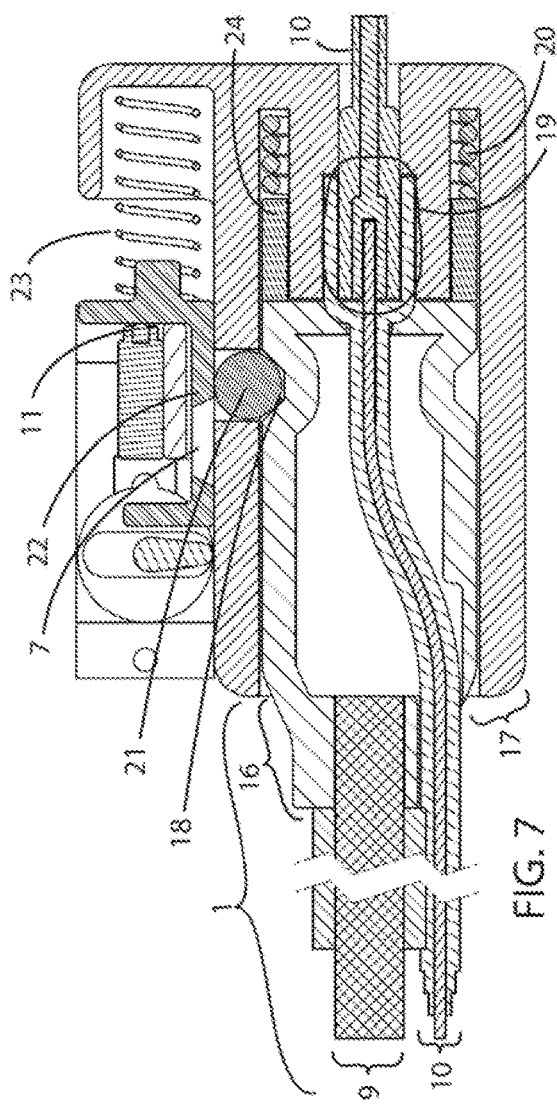

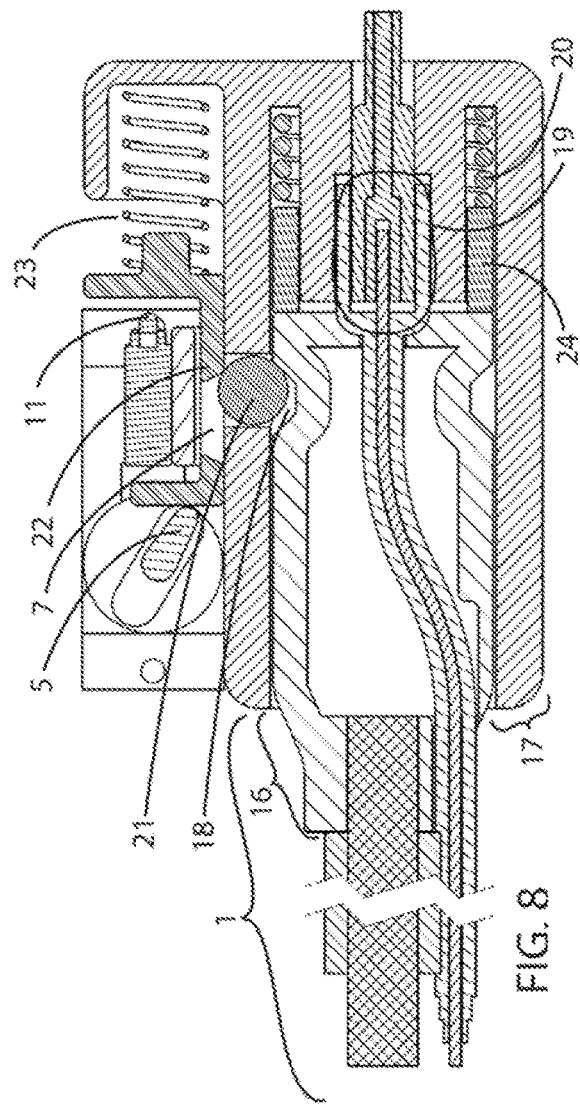
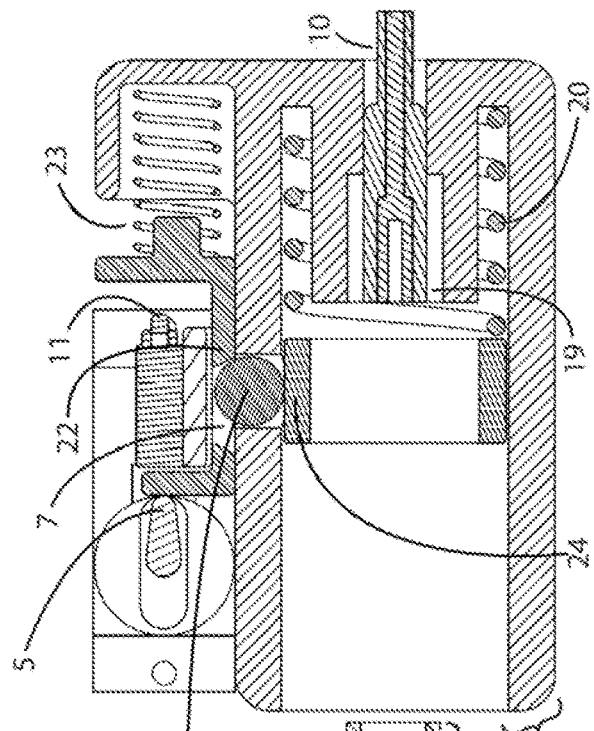
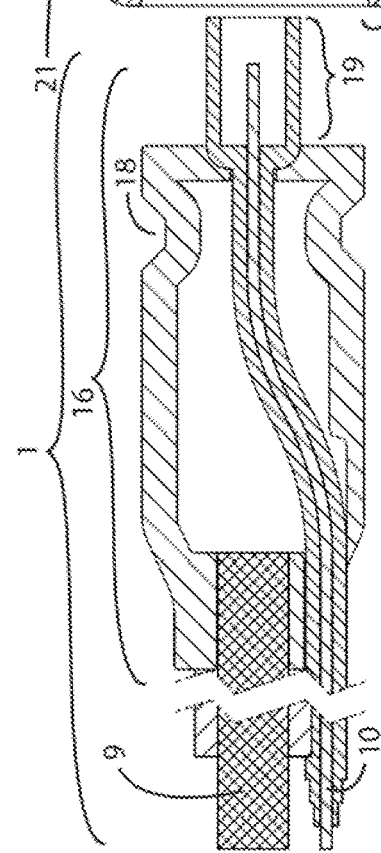
FIG. 8
FIG. 9

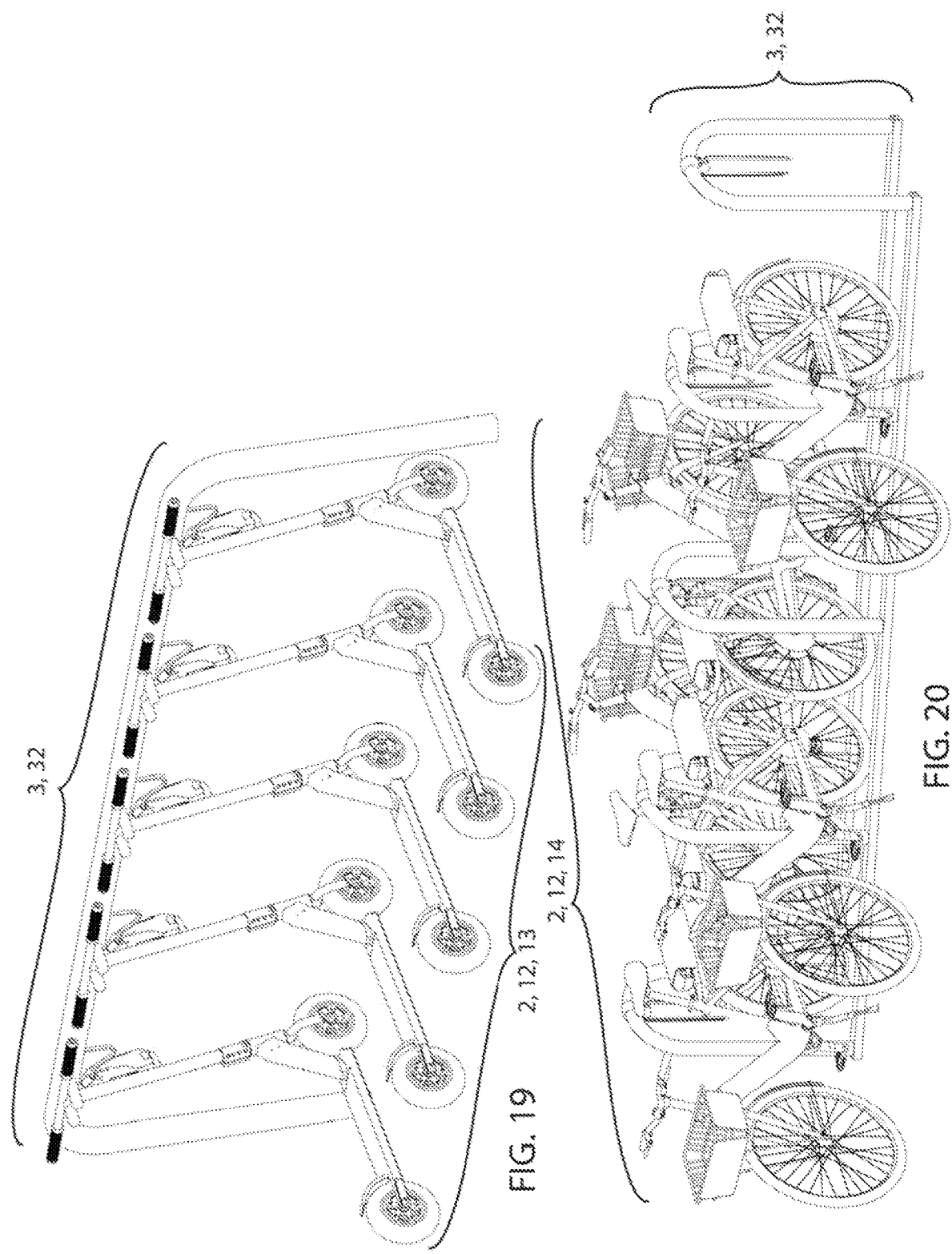

ELECTRIC VEHICLE FASTENING AND CHARGING SYSTEM WITH WIRELESS CONTROL

CROSS-REFERENCE TO RELATED APPLICATIONS

This application is a National Stage of International Application No. PCT/US2019/065145, filed Dec. 9, 2019, which claims priority from U.S. Provisional Application No. 62/777,877, filed Dec. 11, 2018, the entire contents of which are herein incorporated by reference.

BACKGROUND

1. Field of the Invention

This invention relates to an electric vehicle fastening and charging combined system for a charging and storage station, such as is used in bicycle or scooter sharing programs, where a multi-purpose cable extends between the charging and storage station and the electric vehicle, and serves to fasten the electric vehicle to the charging and storage station to prevent removal or theft of the electric vehicle, and to conduct electricity to charge the electric vehicle, and wherein the fastening and/or detaching of the multi-purpose cable is controlled by a wireless signal.

2. Background Information

Bike share, scooter share, and other light vehicle rental systems are becoming increasingly popular. Electric vehicles are also becoming popular, and therefore the merging of the two to offer electric vehicle sharing or rental is desirable. Electric vehicles that are portable enough to be prone to theft, such as eBikes, eScooters, personal mobility electric vehicles, and Neighborhood Electric Vehicles (NEVs), may be used in a rental capacity and in this situation may be left in publicly accessible areas, and are therefore prone to theft and vandalism. Additionally, personal electric vehicles require periodic charging, usually accomplished in the home. However, they can be cumbersome and too large to conveniently bring inside the users dwelling. Finally, docking stations, with specific docking mechanisms and geometries, are often very expensive, and may not work for a variety of electric vehicle types.

Therefore, there is a need to provide a low cost, theft resistant charging and storage outdoor station that accommodates a range of electric vehicles, either personal, or for rentals. More specifically, it is desired to have a charging and storage station wherein the construction of infrastructure is minimal, and only includes a basic physical structure, and charging/fastening cables, but does not include specific expensive docking systems. Finally, providing a charging and storage station that allows for the quick depositing of an electric vehicle and the quick picking up of an electric vehicle is desirable.

SUMMARY OF THE INVENTION

It is an objective of the present invention to set forth a system that allows for electric vehicles to be fastened for storage, and fastened for battery charging using one multi-purpose cable. This cable may be integral to a charging and storage station and detachable from an electric vehicle, or may be integral to an electric vehicle and detachable from the charging and storage station.

Electric vehicles as references herein are vehicles which utilizes one or more electric motors to propel the vehicle, either providing some or all of the propulsion. The one or more electric motors are powered by electricity stored in an on-board power supply such as the one or more battery(s) 4 which are rechargeable. Electric vehicles as referenced herein, shall not include larger automotive-type vehicles, and shall preferably include light electric single, or multi-track vehicles with one or more wheels such as electric scooters (e-scooters), electric bicycles (eBikes), electric skateboards, electric wheelchairs, scooters with one wheel, scooters with two side-by-side wheels, karts, neighborhood electric vehicles, and other electric vehicles not yet invented, but preferably having a gross vehicle weight of less than 1,000 pounds, and more preferably less than 500 pounds not including occupants or accessories.

The multi-purpose cable will provide 100% of the electricity used, or a smaller percentage, when combined with another source such as regenerative braking. The assembly is preferably equipped with an anti-theft audible or visual alarm (not shown) which deploys when the assembly detects unauthorized detachment or attempted cutting of the multi-purpose cable.

The multi-purpose cable is constructed using an anti-theft cable such as a braided metal cable or a rigid metal bar in combination with electrical conducting wires which are preferably collectively encased together by an outer cable sleeve. The anti-theft cable is positioned longitudinally next to the electrical conducting cables (or wires), or may be positioned concentrically with the electrical conducting cables. The multi-purpose cable may contain an anti-theft cable that also serves as an electrical conducting cable. In either case, the anti-theft cable is resistant to cutting or breaking.

It is a further objective of the present invention to set forth a system that allows for easy wireless control of fastening and/or detaching of the electric vehicles and the charging and storage station. The fastening and/or detaching of the electric vehicle and the charging and storage station may be controlled by wireless communications between a wireless communicator such as a mobile phone, and the charging and storage station, either directly, or by way of a server. The fastening and/or detaching of the electric vehicle and the charging and storage station is preferably controlled by wireless communications between a wireless communicator such as a mobile phone, and the electric vehicle, either directly, or by way of a server, while the storage station has, more preferably, no communications. In short, the electric vehicle is preferably a "smart" vehicle, while the station is preferably not a "smart" station, leading to a reduced station cost. In this way, the electric vehicle and the wireless communicator and/or server, communicate regarding to lock or unlock, preferably using an e-key, and such information may be transmitted directly from the server to the electric vehicle, or from the server to the electric vehicle by way of the wireless communicator, or from the wireless communicator to the electric vehicle by way of the server. In accordance with one aspect of the present invention, the insertion of a detachable end of the multi-purpose cable causes a blocking element, such as a ball bearing or other device, to move into place securing the multi-purpose cable end to the receptacle without the use of a motor. In addition, the insertion of the multi-purpose cable end into a receptacle compresses a biasing element, such as a spring, which, when the blocking element is moved, causes the multi-purpose cable end to exit the receptacle.

It is a further objective of the present invention to set forth a system that allows for multiple types of electric vehicles to be charged at the same charging and storage station using the same multi-purpose cable.

It is a further objective of the present invention to set forth a system for electric vehicle rentals to be accomplished from un-staffed locations using a simple wireless user interface application for the controlled unlocking and/or locking of the electric vehicle.

It is a further objective of the present invention to set forth a system that allows for an electric vehicle to be plugged in easily by the user for charging at a charging and storage station.

It is a further objective of the present invention to set forth a charging and storage outdoor station that accommodates a range of electric vehicles, either personal, or for rentals.

It is a further objective of the present invention to set forth a system for electric vehicle rentals that reduces the amount of support the electric vehicles require by requiring the user to connect the charging cable to the electric vehicle in order to end a rental. In this way, the number of visits required by support personnel to the electric vehicle to charge its battery is reduced or eliminated.

It is a further objective of the present invention to set forth a charging and storage station that is low cost to construct by requiring a minimum of infrastructure.

It is a further objective of the present invention to set forth an assembly wherein both a multi-purpose charging and storage cable, and a more simple locking cable both fit with the same receptacle and lock the electric vehicle.

It is a further objective of the present invention to set forth a locking cable with cable end that fits a receptacle on the electric vehicle, and allows the electric vehicle to lock to a public area pole or other object in a public place.

Finally, it is an objective of the present invention to set forth a system that is resistant to vandalism using a construction with wireless controls, and a minimum of infrastructure.

The term servo motor is used herein to reference any type of motor configured to effect and control at least one of the fastening and detaching of the multi-purpose cable from at least one of the electric vehicle and the charging and storage station.

In accordance with a first aspect of the present invention, an electric vehicle fastening and charging combined system is presented comprising; a multi-purpose cable detachable from at least one end, a receptacle, a servo motor, and an embedded system, wherein, the multi-purpose cable extends between a charging and storage station and an electric vehicle, and serves at least two functions, including fastening the electric vehicle to the charging and storage station to prevent the theft or removal of the electric vehicle, and conducting electricity to charge at least one battery on the electric vehicle, and wherein the servo motor is configured to cause at least one of the fastening and detaching of the multi-purpose cable from at least one of the electric vehicle and the charging and storage station, and wherein the servo motor is configured to receive commands from the embedded system to control the servo motor, and wherein the embedded system is configured to perform at least one of receiving and transmitting a wireless signal with a wireless communicator, and wherein the detachment of at least one end of said multipurpose cable may be caused by wireless communication sent by a user by way of said wireless communicator, either directly, or indirectly to said embedded system.

In accordance with a second aspect of the present invention, an electric vehicle fastening and charging combined system is presented further comprising; an electrical cable connector comprising two mating portions, wherein the at least one end of the multi-purpose cable comprises a portion of the electrical cable connector, and wherein inserting the at least one end of the multi-purpose cable into the receptacle causes the receptacle and the at least one end of the multi-purpose cable to automatically lock to each other, and causes the two mating portions of the electrical cable connector to be connected for the flow of electricity.

In accordance with a third aspect of the present invention, an electric vehicle fastening and charging combined system is presented wherein the multi-purpose cable is fixed to the charging and storage station and detachable from the electric vehicle.

In accordance with a fourth aspect of the present invention, an electric vehicle fastening and charging combined system is presented wherein the multi-purpose cable is fixed to the electric vehicle and detachable from the charging and storage station.

In accordance with a fifth aspect of the present invention, an electric vehicle fastening and charging combined system is presented wherein the multi-purpose cable is comprised of a fastening cable, and an electrical cable.

In accordance with a sixth aspect of the present invention, an electric vehicle fastening and charging combined system is presented wherein the fastening cable is positioned longitudinally along the side of the electrical cable.

In accordance with a seventh aspect of the present invention, an electric vehicle fastening and charging combined system is presented wherein the receptacle is further configured to fasten to both the a portion of the electrical cable connector, and a locking cable and cable end without charging.

In accordance with an eighth aspect of the present invention, an electric vehicle fastening and charging combined system is presented further comprising; a sensor, wherein the sensor registers information regarding when the multi-purpose cable is fastened from the charging and storage station to the electric vehicle, and transmits the information to the embedded system.

In accordance with a ninth aspect of the present invention, an electric vehicle fastening and charging combined system is presented wherein the electric vehicle is configured for use as a rental vehicle, and wherein, at the termination of a rental of the rental vehicle, the fastening of the cable to the electric vehicle causes the electric vehicle fastening and charging combined system to automatically register the termination of the rental.

In accordance with a tenth aspect of the present invention, an electric vehicle fastening and charging combined system is presented further comprising; a user device, wherein the wireless communicator is the user device.

In accordance with a eleventh aspect of the present invention, an electric vehicle fastening and charging combined system is presented further comprising; a server, wherein the wireless communicator is the server.

In accordance with a twelfth aspect of the present invention, an electric vehicle fastening and charging combined system is presented wherein the electric vehicle is an electric bicycle.

In accordance with a thirteenth aspect of the present invention, an electric vehicle fastening and charging combined system is presented wherein the electric vehicle is an electric scooter.

In accordance with a fourteenth aspect of the present invention, an electric vehicle fastening and charging combined system is presented further comprising; an electrical cable connector comprising two mating portions, a retaining grove, a ball bearing, a ball bearing capture slide, and a spring, wherein the at least one end of the multi-purpose cable comprises one portion of the electrical cable connector, and the retaining grove, wherein the receptacle comprises the ball bearing, the spring, and the ball bearing capture slide, and wherein the insertion of the at least one end of the multi-purpose cable into the receptacle causes the ball bearing to move to a position located at least partially in the retaining grove, and wherein the ball bearing capture slide moves to a position to prevent the ball bearing from exiting the retaining grove, thereby fastening the at least one end of the multi-purpose cable to the receptacle.

In accordance with a fifteenth aspect of the present invention, an electric vehicle fastening and charging combined system is presented further comprising; a capture slide hole, wherein the detachment is executed when a wireless communication is sent from the wireless communicator to the embedded system, which instructs the servo motor to operate to move the ball bearing capture slide to a position where the ball bearing is able to move into the capture slide hole, thereby exiting the retaining grove and allowing the at least one end of the multi-purpose cable to exit the receptacle to unlock the electric vehicle from the charging and storage station.

BRIEF DESCRIPTION OF THE DRAWINGS

This invention has additional advantages and features which will be apparent from the accompanying drawings, in which:

FIG. 4 depicts a cross sectional view of one example electric vehicle fastening and charging combined system wherein the multi-purpose cable is about to be plugged into the receptacle in accordance with the embodiments of the present invention. Also shown is a locking cable with a cable end that serves as a fastening cable but not a charging cable. It is the first of a sequence of four figures showing the process of fastening the multi-purpose cable.

FIG. 5 depicts a cross sectional view of one example electric vehicle fastening and charging combined system wherein the multi-purpose cable has been inserted into the receptacle but is not yet fastened to the receptacle in accordance with the embodiments of the present invention. It is the second of a sequence of four figures showing the process of fastening the multi-purpose cable.

FIG. 6 depicts a cross sectional view of one example electric vehicle fastening and charging combined system wherein the multi-purpose cable has been inserted into the receptacle and is very close to being fastened to the receptacle in accordance with the embodiments of the present invention. It is the third of a sequence of four figures showing the process of fastening the multi-purpose cable.

FIG. 7 depicts a cross sectional view of one example electric vehicle fastening and charging combined system wherein the multi-purpose cable has been fully inserted into the receptacle and is fastened to the receptacle in accordance with the embodiments of the present invention. It is the fourth of a sequence of four figures showing the process of fastening the multi-purpose cable.

FIG. 8 depicts a cross sectional view of one example electric vehicle fastening and charging combined system wherein the multi-purpose cable has been fully inserted into the receptacle and the servo motor has just begun to unlock the cable in accordance with the embodiments of the present invention. It is the first of a sequence of two figures showing the detaching of the multi-purpose cable.

FIG. 9 depicts a cross sectional view of one example electric vehicle fastening and charging combined system wherein the multi-purpose cable has been unlocked and released from the receptacle by the servo motor in accordance with the embodiments of the present invention. It is the second of a sequence of two figures showing the detaching of the multi-purpose cable.

FIG. 19 depicts a perspective view of one example electric vehicle fastening and charging combined system wherein the electric vehicles, in this case electric scooters, are fastened to the charging and storage station, or to just a storage station, by the multi-purpose cable in accordance with the embodiments of the present invention.

FIG. 20 depicts a perspective view of one example electric vehicle fastening and charging combined system wherein the electric vehicles, in this case electric bicycles, are fastened to the charging and storage station, or to just a storage station, by the multi-purpose cable in accordance with the embodiments of the present invention.

DETAILED DESCRIPTION OF EMBODIMENTS

Figure 1:
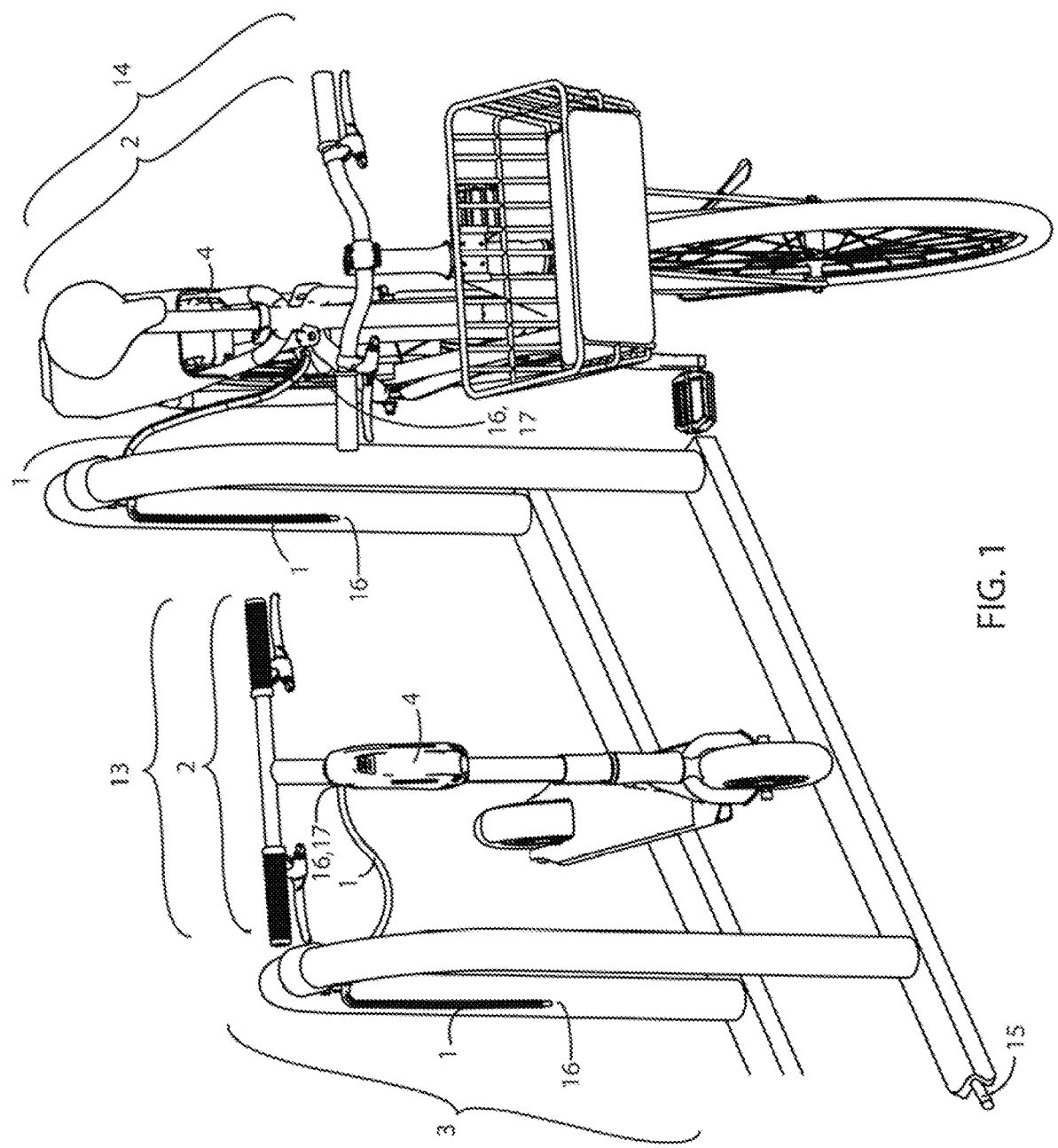
FIG. 1 depicts a perspective view of one example electric vehicle fastening and charging combined system for a charging and storage station where a multi-purpose cable extends between the charging and storage station and the light electric vehicle, in this case an electric bicycle and an electric scooter, and serves to fasten the electric vehicle to the charging and storage station and to conduct electricity to charge the electric vehicle in accordance with the embodiments of the present invention.

Selected embodiments of the present invention will be described in the following, and shown in the figures. It will be apparent to those skilled in the art that these descriptions and figures are provided for illustration purposes only and not for the purpose of limiting the scope of the invention which is as defined by the included claims and their equivalents. Like reference numerals designate corresponding or identical elements throughout the drawings. Many elements of the electric vehicles of the present invention can be found on standard conventional vehicles, and are therefore, in some cases, not labeled and/or not shown as their use is well known and not novel to the present invention.

According to one embodiment of the present invention, referring now to FIG. 1, charging and storage station 3 is shown with electric vehicles 2 being an electric scooter 13 and an electric bicycle 14. Multi-purpose cable 1, with multi-purpose cable end 16, is shown both not fastened to an electric vehicle 2, and fastened. In the case where multi-purpose cable 1 is fastened to electric vehicle 2, multi-purpose cable end 16 is inserted in receptacle 17 thereby both fastening electric vehicle 2 to protect against theft, and causing battery 4 to be charged. Charging and storage station 3 is connect to a power source using electricity supply 15. Power transformers may be housed in charging and storage station 3 or in a separate transformer box (not shown). For simplicity, reference is made throughout this disclosure to a multi-purpose cable end 16, however, such references also include reference to at least one multi-purpose cable end 16.

Figure 2:
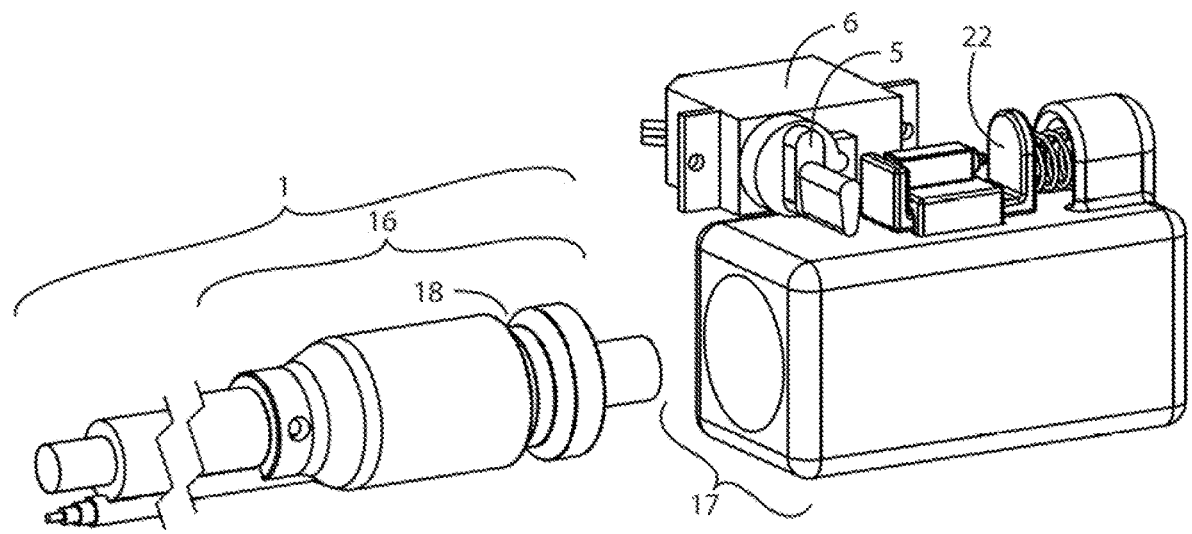
FIG. 2 depicts a perspective view of one example electric vehicle fastening and charging combined system wherein the multi-purpose cable is about to be plugged into the receptacle in accordance with the embodiments of the present invention.

Referring now to FIG. 2, multi-purpose cable end 16 and receptacle 17 are shown in detail in the detached position. Receptacle 17 is mounted on electric vehicle 2 such that multi-purpose cable 1 is fixed to charging and storage station 3 and remains with charging and storage station 3, but receptacle 17 may also be mounted on charging and storage station 3 such that multi-purpose cable 1 is fixed to electric vehicle 2 and travels with electric vehicle 2. Multi-purpose cable end 16 has retaining grove 18, and receptacle 17 is equipped with servo motor 5, embedded system 6, and ball bearing capture slide 22. The insertion of multi-purpose cable end 16 into receptacle 17 can also cause the locking of a separate lock such as a rear wheel lock (not shown). Receptacle 17 may be located on electric vehicle 2 in a number of positions, including as part of a separate fastening system (not shown) which locks a wheel of electric vehicle 2 from rotating.

Figure 3:
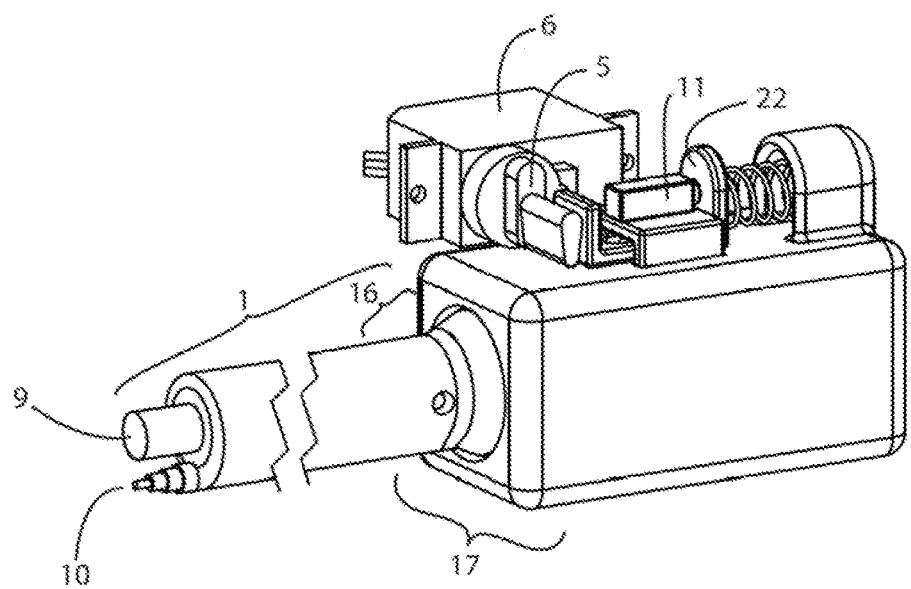
FIG. 3 depicts a perspective view of one example electric vehicle fastening and charging combined system wherein the multi-purpose cable is plugged into the receptacle in accordance with the embodiments of the present invention.

Referring now to FIG. 3, multi-purpose cable end 16 is shown inserted into receptacle 17 causing the fastening of fastening cable 9 to receptacle 17 and the flow of electricity through electrical cable 10, both housed in multi-purpose cable 1. In this position, sensor 11 registers the position of ball bearing capture slide 22, which indicates that multi-purpose cable end 16 and receptacle 17 are fastened together. The positive and negative leads of electrical cable 10 are not shown in detail as they are well known in the trade. Furthermore, additional wires may be included which transfer information between electric vehicle 2 and charging and storage station 3 via multi-purpose cable 1, or electrical cable 10 may be used to conduct such information.

FIGS. 4 to 7 show a sequence of the process of fastening multi-purpose cable end 16 (or alternatively cable end 30) to receptacle 17 and thereby fastening electric vehicle 2 to charging and storage station 3 using multi-purpose cable 1 (or alternatively locking cable 31). Referring now to FIG. 4, multi-purpose cable end 16 and receptacle 17 are shown in cross section in the detached position. Multi-purpose cable end 16 comprises one of two mating portions of electrical cable connector 19, the other of which is mounted on receptacle 17, and the two connect electrical cable 10, one portion of which is mounted on multi-purpose cable end 16, and the other mounted on receptacle 17 for charging. Fastening cable 9 and retaining grove 18 are also shown on multi-purpose cable end 16. On receptacle 17, bearing retainer 24 is held in position by main spring 20 and is holding ball bearing 21 in capture slide hole 7. Ball bearing capture slide 22 is acted on by slide spring 23 pushing it to the left as shown. Also shown is optional cable end 30 without the charging function, wherein a locking cable 31 may be configured to have fastening cable 9, but not electrical cable 10, in the case where fastening is required but charging is not required. In this case, receptacle 17 is constructed to accept either multi-purpose cable end 16 which includes electrical connector 19, or locking cable 31 with cable end 30 which does not include electrical cable connector 19 and electrical cable 10. Locking cable 31 may be fixed to a storage station (FIG. 19 and FIG. 20 may represent such a storage station 32 which does not offer charging), fixed to electric vehicle 2, or not be fixed to anything, and which accompanies the electric vehicle 2 during travel. In this way, electric vehicle 2 is configured to be locked at both charging and storage stations 3 and at storage stations 32 where charging is not available. In addition, electric vehicle 2 may be fastened using locking cable 31 with cable end 30 which accompanies the electric vehicle 2 during travel, and used to lock electric vehicle 2 to poles and other items found in public places. The fastening and detaching shown in the following figures will be the same for locking cable 31 and cable end 30 as for multi-purpose cable 1 and multi-purpose cable end 16, with the exception of the joining of electrical cable connector 19. Locking cable 31 may be constructed using a number of different configurations ranging from a braided type flexible cable to a rigid bar.

Referring now to FIG. 5, multi-purpose cable end 16 and receptacle 17 are shown in cross section in a position where multi-purpose cable end 16 has been inserted into receptacle 17 but the two parts are not yet fastened together. The two mating portions of electrical cable connector 19 have not yet been connected for charging, and ball bearing 21 is still in capture slide hole 7 and not in retaining grove 18. Slide spring 23 is again pushing ball bearing capture slide 22 to the left as shown, and main spring 20 is still in the generally un-sprung state.

Referring now to FIG. 6, multi-purpose cable end 16 has moved further into receptacle 17, and the two are just about to be fastened together. Ball bearing 21 is just starting to drop into retaining grove 18 and exiting capture slide hole 7 thereby allowing ball bearing capture slide 22 to move to the left as shown, acted upon by slide spring 23. The two mating portions of electrical cable connector 19 are just beginning to engage. Sensor 11 is still not yet in contact with ball bearing capture slide 22, and so has not registered that the elements are fastened together. Bearing retainer 24 has been pushed to the right as shown, compressing main spring 20.

Referring now to FIG. 7, multi-purpose cable end 16 has moved all the way in to receptacle 17, and the two are fastened together. In this state, pulling on multi-purpose cable 1 and fastening cable 9 will not release multi-purpose cable end 16 from receptacle 17. Ball bearing 21 has dropped into retaining grove 18 and exited capture slide hole 7 thereby allowing slide spring 23 to push ball bearing capture slide 22 causing it to move to the left as shown, to a position where ball bearing 21 can no longer re-enter capture slide hole 7. Ball bearing capture slide 22 has depressed a switch on sensor 11 which registers that ball bearing capture slide 22 is now in a fastened position and therefore the assembly is fastened. Bearing retainer 24 has been pushed to the right as shown, compressing main spring 20. The two mating portions of electrical cable connector 19 are engaged, allowing the two sides of electrical cable 10 to connect and for charging to take place. While a single ball bearing 21 is shown, it will be apparent to those skilled in the art that a plurality of ball bearing 21 may be required to fasten electrical cable connector 19 to receptacle 17 in multiple locations.

FIGS. 8 and 9 show a sequence of the process of detaching multi-purpose cable end 16 from receptacle 17 and thereby detaching electric vehicle 2 from charging and storage station 3. Referring now to FIG. 8, servo motor 5 has begun to rotate to push ball bearing capture slide 22 to the right compressing slide spring 23 as shown in the figure, allowing ball bearing 21 to begin to enter capture slide hole 7 and exit retaining grove 18. Ball bearing capture slide 22 is no longer depressing a switch on sensor 11 which registers that ball bearing capture slide 22 is no longer in a fastened position. Bearing retainer 24 remains pushed mostly to the right as shown, compressing main spring 20.

Referring now to FIG. 9, servo motor 5 has completed its rotation to push ball bearing capture slide 22 to the right compressing slide spring 23 as shown in the figure, allowing ball bearing 21 to fully enter capture slide hole 7 and exit retaining grove 18 which in turn allows multi-purpose cable end 16 to completely exit receptacle 17. Ball bearing capture slide 22 is no longer depressing a switch on sensor 11 which registers that ball bearing capture slide 22 is no longer in a fastened position. Main spring 20 has now pushed bearing retainer 24 to the left where it retains ball bearing 21. Fastening cable 9 is no longer retaining electric vehicle 2 and electrical cable 10 is no longer conducting electricity as the two mating portions of electrical cable connector 19 are no longer in contact. FIGS. 2-9 set forth one assembly for fastening and detaching the multi-purpose cable 1, however, it will be apparent to those skilled in the art that a number of substitutions and alternations are possible in order to fasten electrical cable connector 19 to receptacle 17 and these various modifications and changes may be made thereto without departing from the broader spirit and scope of the invention.

Figure 10:
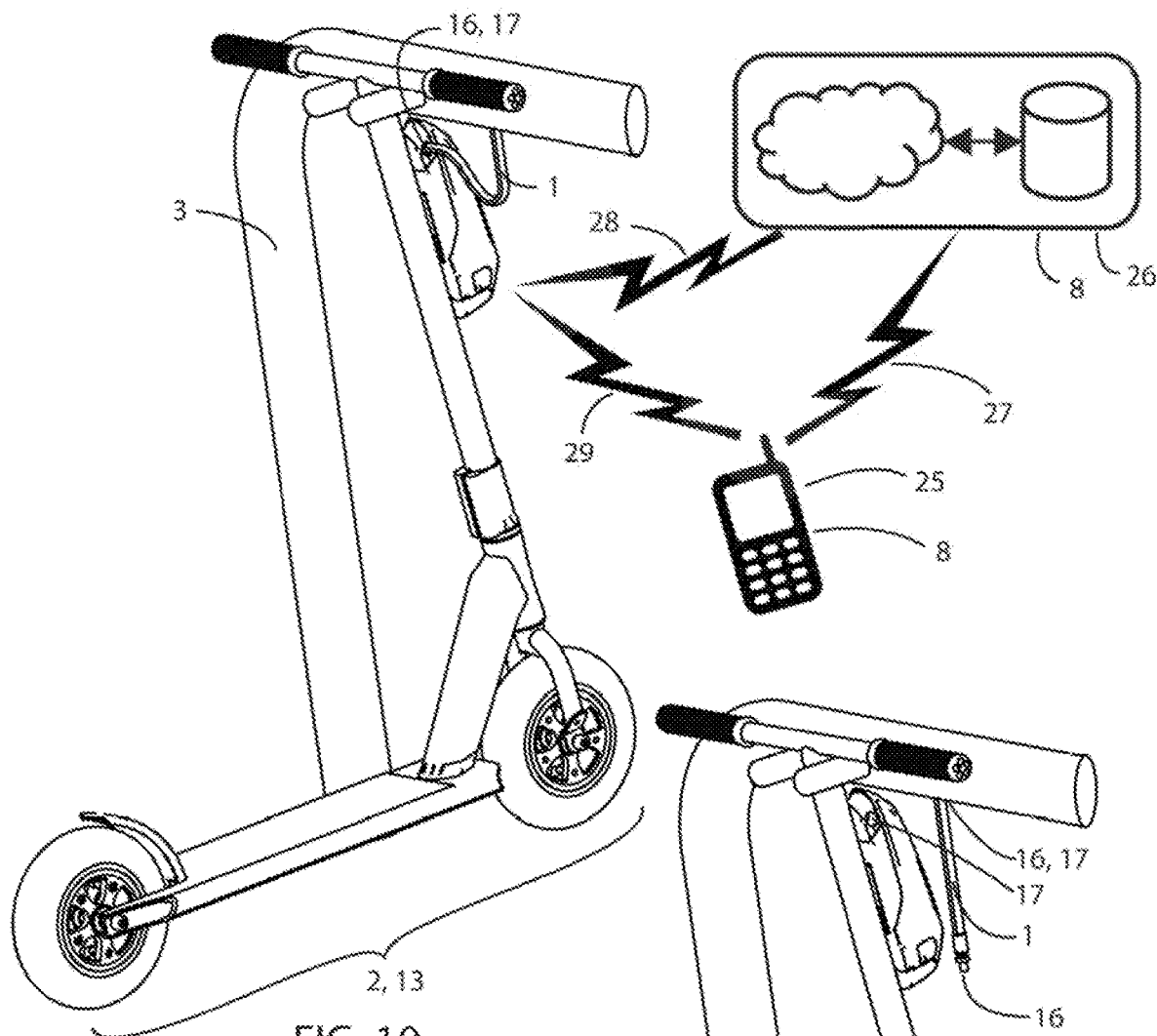
FIG. 10 depicts a perspective view of one example electric vehicle fastening and charging combined system wherein the electric vehicle, in this case an electric scooter, is fastened to the charging and storage station by the multi-purpose cable, and wherein the electric vehicle is communicating by wireless signal to a wireless communicator, which is either the user device, or the server in accordance with the embodiments of the present invention.

Referring now to FIG. 10, electric vehicle 2, shown here as electric scooter 13, is fastened by multi-purpose cable 1 to charging and storage station 3 by inserting multi-purpose cable end 16 into receptacle 17. Also shown is wireless communicator 8, which is illustrated as a user device 25 such as a mobile phone or smart phone, but which may also be a laptop computer, a task specific device, or another type of wireless communicator, and which may communicate with either electric vehicle 2 or server 26 using wireless communication 29 and/or wireless communication 27. Server 26 may also communicate with electric vehicle 2 using wireless communication 28. Server 26 may also serve as wireless communicator 8. It may be desirable to use wireless communication 27 between user device and server, wireless communication 28 between server and electric vehicle, or wireless communication 29 between user device and electric vehicle, or any combination thereof for fastening and/or unfastening of electric vehicle 2 from charging and storage station 3, and for transferring data. It should be noted that the wireless communicator 8, and server 26 are not part of charging and storage station 3. While an electric scooter is shown, it will be apparent to those skilled in the art that a wide variety of electric vehicles are possible, such as electric bicycles, Neighborhood Electric Vehicles, electric skateboards, scooters with one wheel, scooters with two side-by-side wheels, and other electric vehicles not shown, without departing from the scope of this invention.

Figure 11:
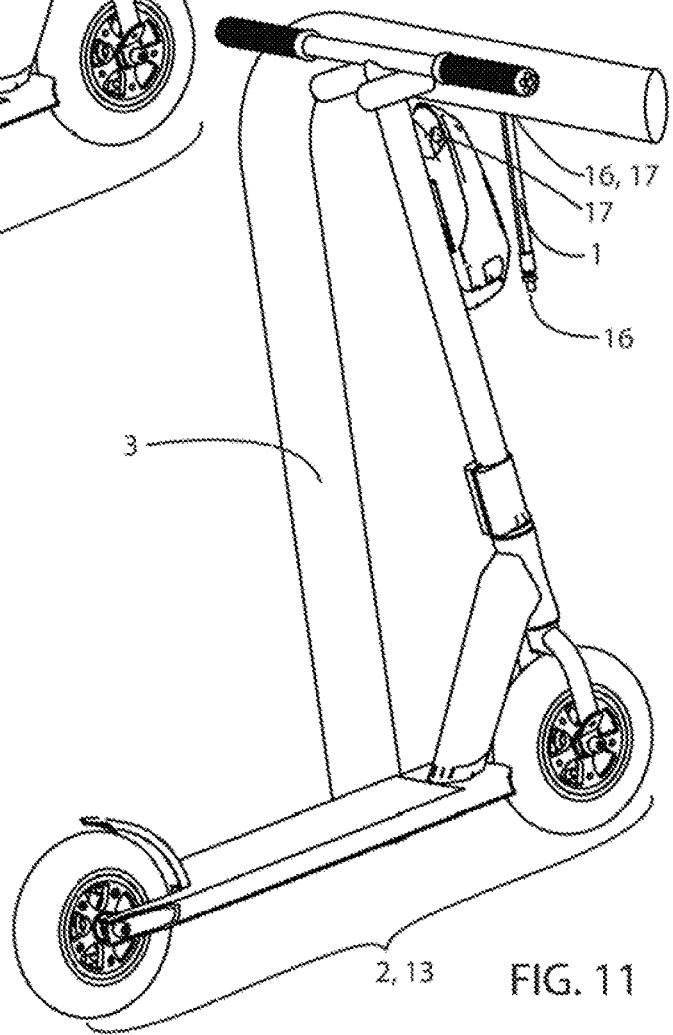
FIG. 11 depicts a perspective view of one example electric vehicle fastening and charging combined system wherein the electric vehicle, in this case an electric scooter, is no longer fastened to the charging and storage station by the multi-purpose cable in accordance with the embodiments of the present invention.

Referring now to FIG. 11, electric vehicle 2, again shown as electric scooter 13, is no longer fastened to charging and storage station 3 by multi-purpose cable 1, as a result of wireless communications received from wireless communicator 8 (see FIG. 10). Multi-purpose cable end 16 has been detached from receptacle 17 on electric scooter 13. Also shown in the option to have receptacle 17 mounted on charging and storage station 3 wherein multi-purpose cable 1 would travel with electric vehicle 2 rather than remaining at charging and storage station 3.

Figure 13:
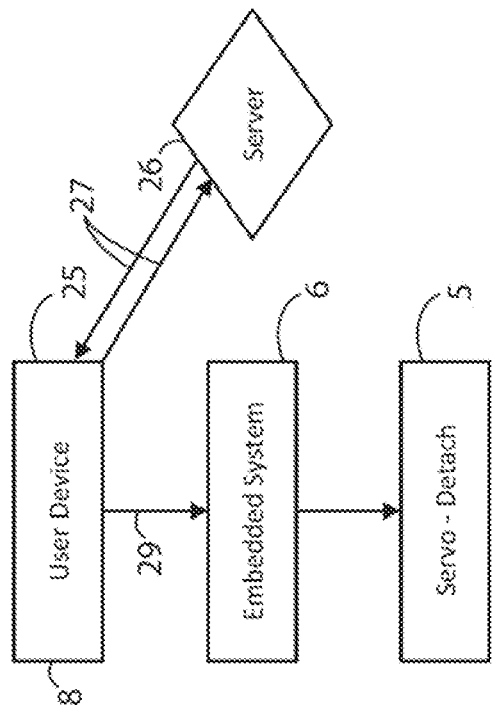
FIG. 13 depicts a simplified block diagram of one example flow of information between the various components in the detaching of the electric vehicle in accordance with the embodiments of the present invention.
Figure 12:
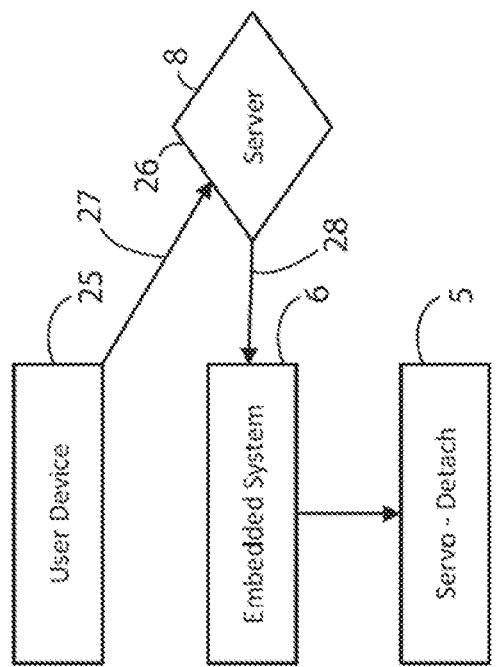
FIG. 12 depicts a simplified block diagram of one example flow of information between the various components in the detaching of the electric vehicle in accordance with the embodiments of the present invention.
Figure 15:
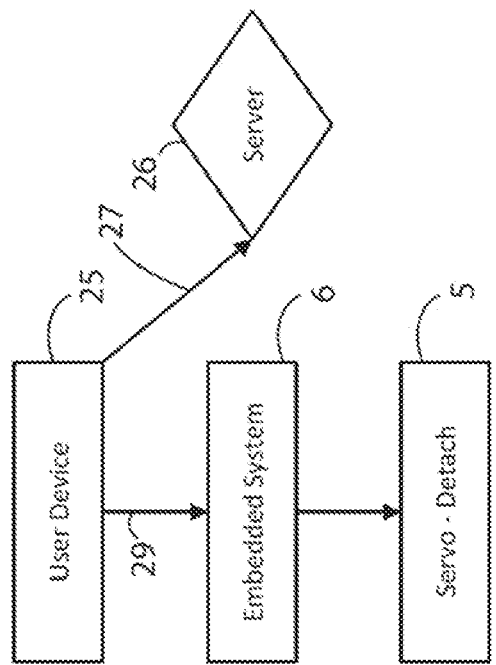
FIG. 15 depicts a simplified block diagram of one example flow of information between the various components in the detaching of the electric vehicle in accordance with the embodiments of the present invention.
Figure 14:
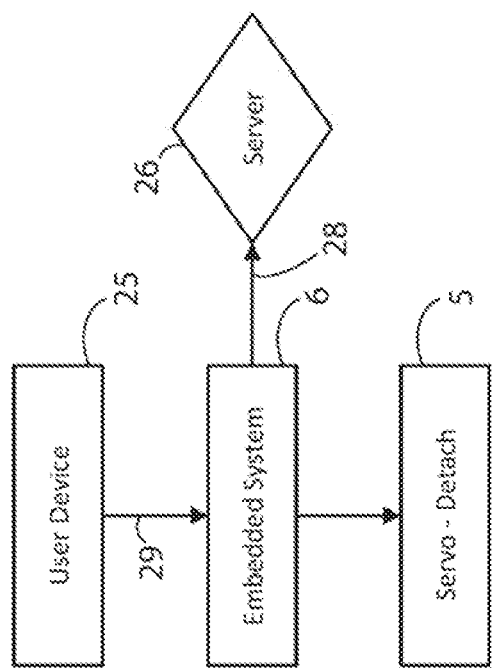
FIG. 14 depicts a simplified block diagram of one example flow of information between the various components in the detaching of the electric vehicle in accordance with the embodiments of the present invention.

FIGS. 12 to 15 show various options for the flow of communications during the detaching of multi-purpose cable 1 for use of electric vehicle 2. FIG. 12 shows one option where user device 25 sends wireless communication 27 to server 26 which in turn sends wireless communication 28 to embedded system 6 which then causes servo motor 5 to detach. In this example, there is no direct communication between user device 25 and embedded system 6, and server 26 acts as wireless communicator 8. Alternatively FIG. 13 shows user device 25 and server 26 sending wireless communication 27, and user device 25 communicating by wireless communication 29 with embedded system 6 which in turn causes servo motor 5 to detach. In this case there is no direct communication between server 26 and embedded system 6, and instead user device 25 acts as wireless communicator 8. FIG. 14 shows user device 25 and embedded system 6 sending wireless communication 29, and server 26 and embedded system 6 sending wireless communication 28, which in turn communicates with servo motor 5 to detach. Finally, FIG. 15 shows user device 25 and server 26 sending wireless communication 27 and user device 25 and embedded system 6 sending wireless communication 29 which causes servo motor 5 to detach. It will be apparent to those skilled in the art that a wide variety of communications configurations are possible, other than those shown, without departing from the scope of the invention. This may include communications sent through wires. It should be noted that, arrows are drawn one way to denote the flow of key information. However, this does not indicate that communications in the opposite direction are not possible, and in fact, communications in both directions may be desirable. Furthermore, additional communicating devices and embedded systems which are not shown may be desirable.

Figure 16:
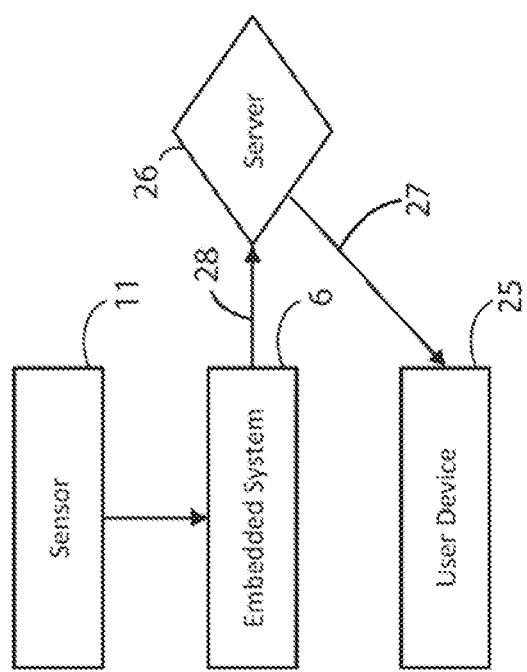
FIG. 16 depicts a simplified block diagram of one example flow of information between the various components in the fastening of the electric vehicle in accordance with the embodiments of the present invention.
Figure 18:
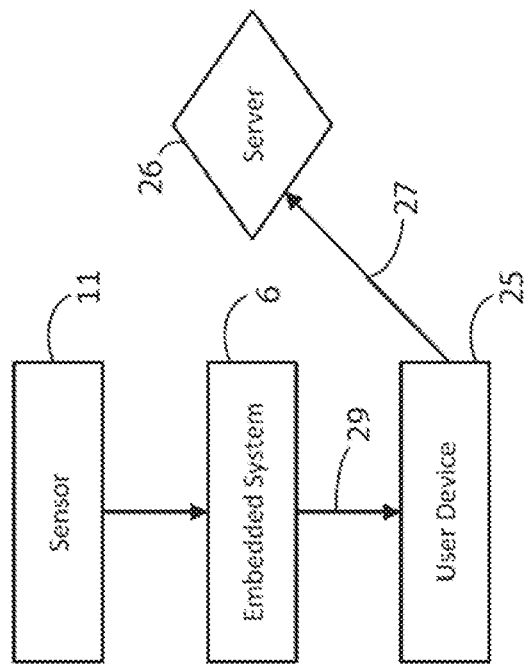
FIG. 18 depicts a simplified block diagram of one example flow of information between the various components in the fastening of the electric vehicle in accordance with the embodiments of the present invention.
Figure 17:
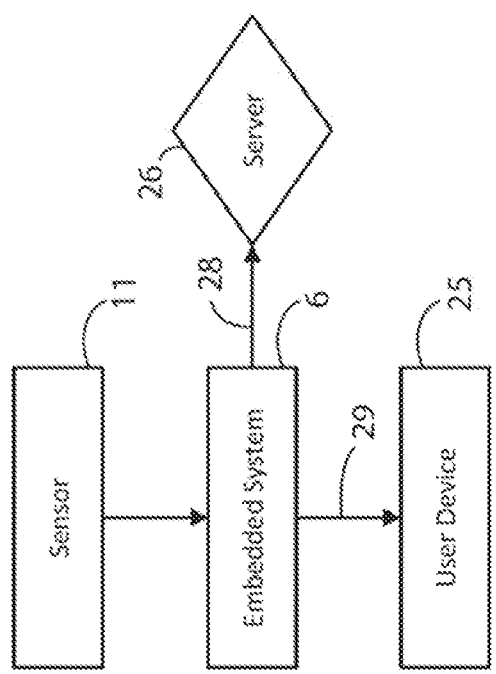
FIG. 17 depicts a simplified block diagram of one example flow of information between the various components in the fastening of the electric vehicle in accordance with the embodiments of the present invention.

FIGS. 16 to 18 show various options for the flow of communications during the fastening of electric vehicle 2 to charging and storage station 3 using multi-purpose cable 1. The usual method of fastening electric vehicle 2 to charging and storage station 3 includes manually inserting multi-purpose cable end 16 into receptacle 17, which activates sensor 11. FIG. 16 shows sensor 11 communicating with embedded system 6 which communicates (using wireless communication 28) with server 26, which may, in turn communicate (using wireless communication 27) with user device 25 indicating, for example, that the vehicle has been fastened and the rental has been terminated. FIG. 17 shows a variation with sensor 11 communicating with embedded system 6 which communicates (using wireless communication 28) with server 26 and also communicates with user device 25 (using wireless communication 29). Finally, FIG. 18 shows that sensor 11 may communicate with embedded system 6 which communicates (using wireless communication 29) with user device 25, which then communicates (using wireless communication 27) with server 26. It will be apparent to those skilled in the art that a wide variety of communications configurations are possible, other than those shown, without departing from the scope of the invention. It should be noted that, arrows are drawn one way to denote the flow of key information. However, this does not indicate that communications in the opposite direction are not possible, and in fact, communications in both directions may be desirable. Furthermore, additional communicating devices including additional embedded systems and/or sensors which are not shown may be desirable.

FIG. 19 shows charging and storage station 3 with electric vehicle 2 shown as electric scooter 13, and possibly being rental vehicle 12. In this way, charging and storage station 3 may be configured to charge and store all of one type of electric vehicle 2. FIG. 20 shows charging and storage station 3 with electric vehicle 2 shown as electric bicycle 14, and possibly being rental vehicle 12. In this way, charging and storage station 3 may again be configured to charge and store all of one type of electric vehicle 2. Alternatively, also shown in FIG. 19 and FIG. 20 is the alternate storage station 32 which fastens electric vehicles 2, but does not charge them. Not shown, but apparent to those skilled in the art, are a wide variety of electric vehicles that require charging, and require anti-theft fastening, such as neighborhood electric vehicles, and e-scooters with a single wheel, or side-by-side wheels. Also not shown, but apparent to those skilled in the art, are different designs and configurations of charging and storage stations 3 which do not depart from the scope of this invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An electric vehicle fastening and charging combined system comprising:
   a multi-purpose cable detachable from only one end,
   a receptacle,
   a servo motor, and
   an embedded system,
   wherein, said multi-purpose cable extends between a charging and storage station and an electric vehicle, and serves at least two functions, including fastening said electric vehicle to said charging and storage station to prevent the theft or removal of said electric vehicle, and conducting electricity to charge at least one battery on said electric vehicle, and
   wherein said servo motor is configured to cause at least one of the fastening and detaching of said multi-purpose cable from one of said electric vehicle and said charging and storage station, and wherein said servo motor is configured to receive commands from said embedded system to control said servo motor, and
   wherein the detachment of said only one end of said multi-purpose cable may be caused by wireless communication sent by a user by way of a wireless communicator, either directly, or indirectly to said embedded system.

2. The electric vehicle fastening and charging combined system of claim 1, wherein said multi-purpose cable is fixed to said charging and storage station and detachable from said electric vehicle.

3. The electric vehicle fastening and charging combined system of claim 1, wherein said multi-purpose cable is fixed to said electric vehicle and detachable from said charging and storage station.

4. The electric vehicle fastening and charging combined system of claim 1, wherein said multi-purpose cable is comprised of a fastening cable, and an electrical cable.

5. The electric vehicle fastening and charging combined system of claim 4, wherein said fastening cable is positioned longitudinally along the side of said electrical cable.

6. The electric vehicle fastening and charging combined system of claim 1, wherein said receptacle is further configured to fasten to both said portion of said electrical cable connector, and a locking cable and cable end without charging function.

7. The electric vehicle fastening and charging combined system of claim 1, further comprising:
   a sensor,
   wherein said sensor registers information regarding when said multi-purpose cable is fastened from said charging and storage station to said electric vehicle, and transmits said information to said embedded system.

8. The electric vehicle fastening and charging combined system of claim 7, wherein said electric vehicle is configured for use as a rental vehicle, and wherein, at the termination of a rental of said rental vehicle, the fastening of said multi-purpose cable to said electric vehicle causes said electric vehicle fastening and charging combined system to register the termination of said rental.

9. The electric vehicle fastening and charging combined system of claim 1, wherein said electric vehicle is an electric bicycle.

10. The electric vehicle fastening and charging combined system of claim 1, wherein said electric vehicle is an electric scooter.

11. The electric vehicle fastening and charging combined system of claim 1
   wherein said receptacle is constructed to accept either
      a multi-purpose cable end with electrical connector for charging an electric vehicle with at least one battery, or
      a locking cable with cable end which does not include an electrical cable connector,
   wherein said multi-purpose cable end with electrical connector connects an electrical cable to a charging and storage station, and wherein the opposite end of said locking cable with cable end which does not include an electrical cable connector may be
fixed to a storage station, or
fixed to said electric vehicle and accompanies said electric vehicle during travel and used to lock said electric vehicle to poles and other items found in public places.

12. The electric vehicle fastening and charging combined system of claim 1, further comprising:
a charging and storage station.

13. The electric vehicle fastening and charging combined system of claim 1, further comprising:
an electric vehicle with at least one battery.

14. The electric vehicle fastening and charging combined system of claim 1, further comprising:
a wireless communicator.

15. The electric vehicle fastening and charging combined system of claim 1, further comprising:
a biasing element,
a multi-purpose cable end, and
a blocking element,
wherein the insertion of the multi-purpose cable end into the receptacle compresses the biasing element, such that moving the blocking element causes the multi-purpose cable end to move in the direction to exit the receptacle.

16. The electric vehicle fastening and charging combined system of claim 15, further comprising:
a spring,
wherein the biasing element is comprised of the spring.

17. The electric vehicle fastening and charging combined system of claim 1, further comprising:
a multi-purpose cable end,
wherein inserting the multi-purpose cable end into the receptacle causes the receptacle and the multi-purpose cable end to automatically lock to each other.

18. The electric vehicle fastening and charging combined system of claim 1, further comprising:
an electrical cable connector comprising two mating portions,
wherein said only one end of said multi-purpose cable comprises a portion of said electrical cable connector, and
wherein inserting said only one end of said multi-purpose cable into said receptacle causes said receptacle and said only one end of said multi-purpose cable to automatically lock to each other, and causes said two mating portions of said electrical cable connector to be connected for the flow of electricity.

19. A method for fastening and charging an electric vehicle to a charging and storage station wherein a multi-purpose cable extends between said charging and storage station and said electric vehicle, and wherein said multi-purpose cable serves at least two functions, including:
fastening said electric vehicle to said charging and storage station to prevent the theft or removal of said electric vehicle, and
conducting electricity to charge at least one battery on said electric vehicle,
and wherein at least one of the fastening and detaching of said multi-purpose cable from at least one of said electric vehicle and said charging and storage station is caused by wireless communication sent by a wireless communicator.

\* \* \* \* \*